UNITED STATES PATENT OFFICE.

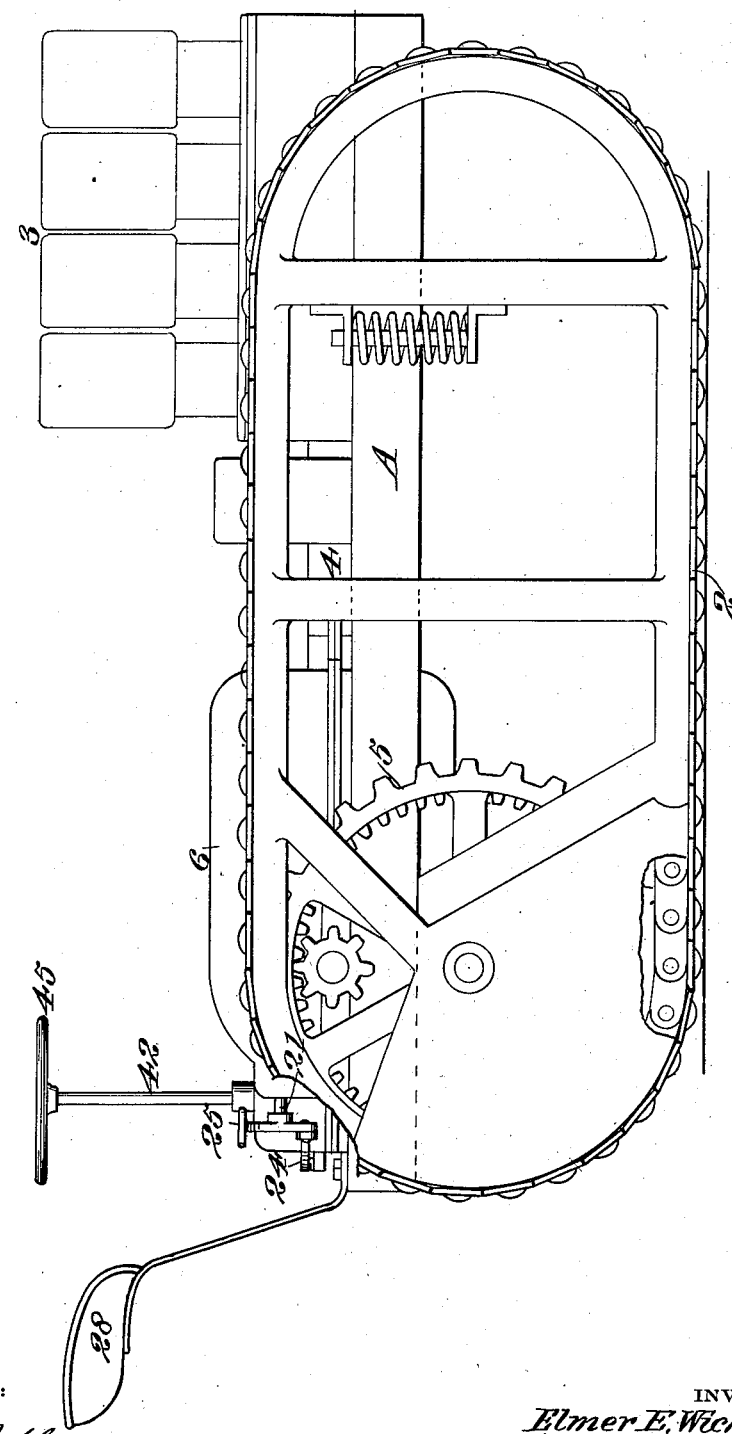

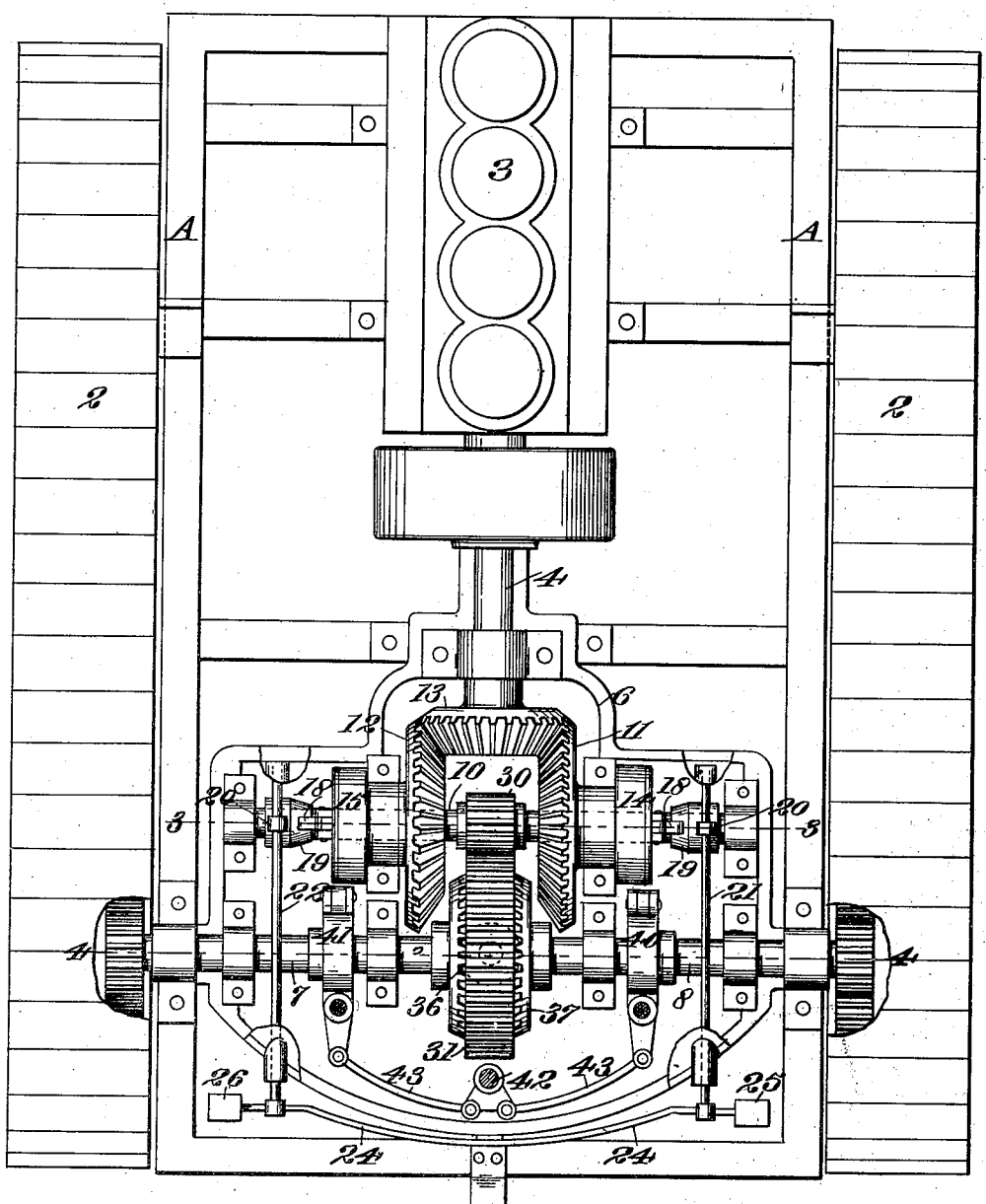

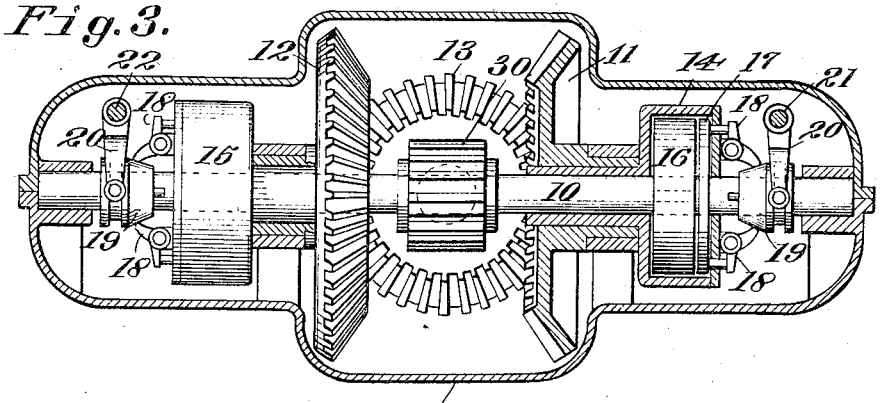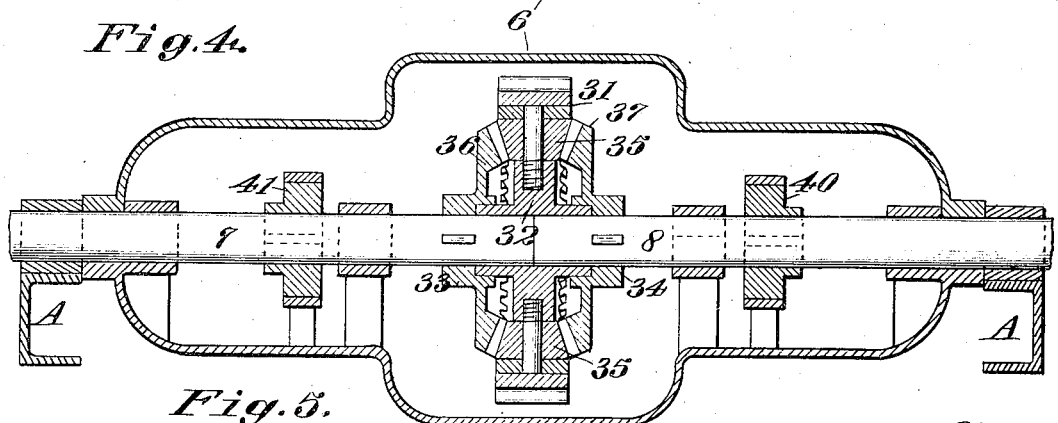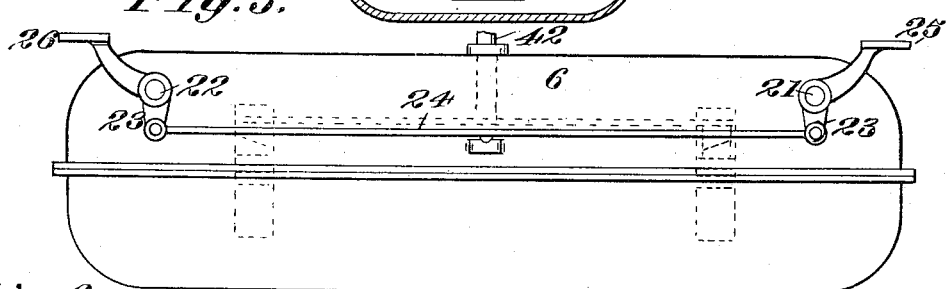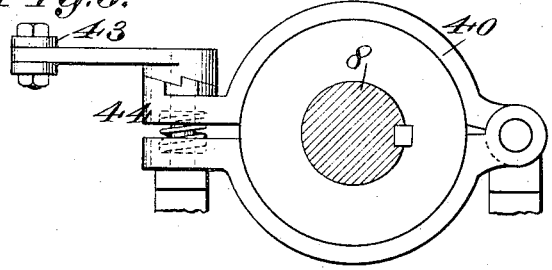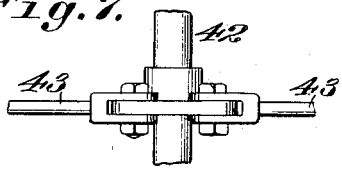

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTION-ENGINE.

1,356,678.    Specification of Letters Patent.    Patented Oct. 26, 1920.

Application filed August 9, 1915. Serial No. 44,378.

*To all whom it may concern:*

Be it known that I, ELMER E. WICKERSHAM, a citizen of the United States, residing at Stockton, in the county of San Joaquin and State of California, have invented a new and useful Improvement in Traction-Engines, of which the following is a specification.

This invention relates to traction engines and pertains especially to traction engine transmission and control, particularly designed for use in conjunction with two-track machines of the self-laying track variety, although it will be manifest that the invention is applicable to round wheel engines.

In the operation of two-track machines in the past employing a differential there has been required a number of levers for individual and independent operation necessitating in addition to the inconvenience due to the multiplicity of levers, the disengaging of the engine clutch from the transmission in order to shift the gears into reverse position. This would cause an undesirable severe strain and racking of the engine parts making a nicety or smoothness of control difficult, if not impossible.

The object of the present invention is to overcome these objections, which has been done by a simple, practical arrangement and design, as hereinafter set forth, and whereby all need for a clutch between the engine and transmission is dispensed with and the steering of the machine is accomplished by a steering wheel in as simple a manner as an automobile is guided over a smooth road. A particular object of the present invention is to provide an oil and dust-proof casing for the entire transmission and gearing, so mounted upon the engine frame as to be supported at three points only; this case forming a bed plate for these parts so as to maintain them all in proper alinement and adjustment, irrespective of the nature of the ground traversed. A further object is to provide a system of clutches in conjunction with the differential whereby only one clutch may be in at a time, or whereby both clutches may be moved to neutral, and whereby the operator may go immediately into reverse from forward, or vice versa, without the use of any intermediate clutches or gear shifting mechanism. A further and particular object is to provide a type of differential which will permit the use of parallel shafting facilitating the machining of the gear case and also does away with side or end thrust on the divided shaft.

The invention consists of the parts and the combination and construction of parts as hereinafter more fully described and claimed, having reference to the accompanying drawings, in which—

Figure 1 is a side elevation of a traction engine to which the invention is applicable.

Fig. 2 is a plan view of the same.

Fig. 3 is an elevation in partial section on line 3—3 of Fig. 2.

Fig. 4 is an elevation in partial section on line 4—4 of Fig. 2.

Fig. 5 is an end elevation of a fragment of the machine showing the foot lever arrangement.

Fig. 6 is an elevation of the cam to tighten the band brake.

Fig. 7 shows the steering post connection.

A represents the engine frame or chassis of suitable construction, here shown as mounted on a pair of endless self-laying tracks 2; it being understood that the steering of the machine is effected through controlling the movements of one or the other of these tracks 2. 3 is a motor mounted on the engine frame transmitting its power through its shaft 4, and the hereinafter described connection back to sprockets 5 by which the tracks 2 are driven.

The present invention resides in the connections between shaft 4 and sprockets 5, and the mounting for these connections. This mounting is here shown as comprising a casing 6 of novel design and incasing all of these connections, including transmission, gears, clutches, brakes, etc., and has but three points of support: one at the forward end on shaft 4, and the other two points on the divided sprocket or drive shafts 7—8. This casing is divided preferably horizontally to form a removable cover portion to give access to the contained mechanism.

Journaled transversely in casing 6 is a jack shaft 10 on which are loosely mounted the opposed beveled gears 11—12 arranged in continuous engagement with miter gear 13 on the engine shaft 4. Gears 11—12 are adapted to be locked to the jack shaft 10 by one or the other of their respective clutches 14—15; clutch 14 and its gear 11 being for forward drive, and gear 12 and its clutch 15 being for reverse. Clutches 14—15 are preferably of the friction type and comprise as here shown, a disk 16 and a complementary loose friction disk 17 operable toward and from the fixed disk 16, by appropriate means as the bell cranks 18 and cone 19; which latter is shiftable on shaft 10 by shifter yoke 20. Yoke 20 on the right side of the machine is fast to a rearwardly extending rock shaft 21, and yoke 20 on the left side of the machine is made fast to a rearwardly extending rock shaft 22; these two rock shafts 21—22 being connected by cranks 23 and link 24 and operable in unison by the foot levers 25—26. Thus it will be seen to place the parts in "go-ahead" position foot lever 25 will be depressed which will operate to throw clutch 14 in, and clutch 15 out. Likewise, for reverse, foot lever 26 will be depressed throwing in clutch 15 and throwing out clutch 14. These two foot levers 25—26 are in convenient reach of the feet of the operator, mounted on the seat 28.

Jack shaft 10 carries a spur pinion 30 which is in constant mesh with a spur differential gear wheel 31. The gear wheel 31 comprises a ring which for constructional purposes is provided with a tapered seat fitting over and keyed to a hub member 32 in which divided shaft 7—8 is loosely received. This differential gear 31 and its hub 32 carry the floating bevel pinions 35 which mesh the complementary bevel gears 36—37, keyed respectively to the parts 33—34 of the divided drive shaft.

It is understood that the sprocket wheels 5 are mounted on, or are driven from the divided shaft 7—8.

Thus it will be seen that motion is transmitted from the jack shaft 10 in either direction, according to which clutch 14 or 15 is in back to the divided shaft and to the tracks through the pinion 30, and gears 31—35—36 and 37.

The steering of the machine is effected by retarding more or less one track with respect to the other. This retardation is effected through the medium of a pair of hand brakes 40—41 arranged one on each side of the differential, and connecting each band brake with a steering post 42, through the medium of the links 43 and suitable band tightening means, as the cams 44. By turning the hand-wheel 45 in one direction post 42 is rocked to tighten one band brake, and release the other to cause the machine to turn to the right; turning it in the opposite direction reverses the operation.

The construction of this type of transmission permits an oil and dust-proof casing; does away with all exposed gearing. Furthermore, the case by reason of its trunnioning on the main transmission shaft and the two sprocket shafts has only an indirect connection with the main frame and provides a three-point suspension for the transmission. There is only one clutch normally in operation at any given time; the latitude of movement of the two clutches is sufficient to allow both to be out at the same time, or in neutral position, permitting the engine to be started and thus doing away with the need of any clutch between the engine and the transmission case, as is now commonly necessary. Both forward and reverse clutches are foot controlled and are so connected as to make it impossible for both clutches to be in at the same moment, yet permitting the clutches to assume a neutral, as just described.

The particular type of differential is of particular importance, permitting the use of parallel shafting with direct drive, at the same time facilitating shop work on the case.

The steering is done by applying the band brakes one on each side of the differential alternately as is desired by the simple movement of the steering wheel. The combination of the differential, friction clutches, band brakes and steering wheel provides a mechanism of flexibility in, and smoothness of operation of the machine, with a minimum of parts.

Having thus described my invention what I claim and desire to secure by Letters Patent is—

1. In a tractor, a pair of traction devices by which the vehicle is supported and steered, and transmission means therefor comprising forward and reverse gearing, a separate friction clutch for each whereby to operatively connect the desired gearing with the traction devices, and unitary means to control both clutches, said means being capable of preventing simultaneous engagement of the clutches and permitting both clutches to occupy a neutral position simultaneously, said controlling means comprising a rock shaft for each clutch mechanism, a pedal on each rock shaft and a connection between opposite shafts whereby turning of one imparts similar movement to the other.

2. In a tractor, a pair of traction devices through which the vehicle is supported and steered, and transmission means therefor comprising a transverse jack-shaft, forward driving clutch mechanism operatively connecting the jack-shaft to the motor, reverse clutch mechanism operatively connecting the jack-shaft to the motor, a divided drive shaft operatively connected to the jack-shaft, said drive shaft including differential mechanism, unitary control means for both clutch mechanisms whereby to cause the tractor to be driven in opposite directions, and unitary means for applying resistance to each section of the drive-shaft alternately, but not simultaneously, whereby to steer the tractor.

3. A driving and control mechanism for tractors, comprising a main shaft extending longitudinally of the tractor frame, an intermediate shaft disposed laterally of said frame, a pair of freely rotating gears carried by said shaft, a gear upon the main shaft with which said pair of gears are constantly in mesh at points upon the opposite sides of the longitudinal axis of said main shaft, a gear fixed to the intermediate shaft and disposed between said freely mounted gears, friction clutches carried upon the intermediate shaft for alternately and variably producing a driving operation of the intermediate shaft from one of the freely mounted gears carried thereby, a divided shaft parallel to said intermediate shaft and connected at its opposite outer ends with traction devices to be driven thereby, a differential gear mechanism carried upon the abutting ends of said shaft and in constant driving connection with the intermediate shaft and alternately operating means for frictionally engaging the opposite halves of the divided shaft to produce relative variation in their driving speeds, and unitary control means for both friction clutches capable of preventing simultaneous engagement of the same and permitting both clutches to occupy a neutral position simultaneously.

In testimony whereof I have hereunto set my hand in the presence of two subscribing witnesses.

ELMER E. WICKERSHAM.

Witnesses:
JOHN H. HERRING,
R. S. SPRINGER.